(12) United States Patent
Suarez-Hernandez

(10) Patent No.: US 10,029,234 B2
(45) Date of Patent: Jul. 24, 2018

(54) COMPOUNDED SURFACE TREATED CARBOXYALKYLATED STARCH POLYCRYLATE COMPOSITES

(71) Applicant: ARCHER DANIELS MIDLAND COMPANY, Decatur, IL (US)

(72) Inventor: Oscar Suarez-Hernandez, Saint-Laurent (CA)

(73) Assignee: Archer Daniels Midland Company, Decatur, IL (US)

( * ) Notice: Subject to any disclaimer, the term of this patent is extended or adjusted under 35 U.S.C. 154(b) by 650 days.

(21) Appl. No.: 14/399,013

(22) PCT Filed: Apr. 19, 2013

(86) PCT No.: PCT/US2013/037274
§ 371 (c)(1),
(2) Date: Nov. 5, 2014

(87) PCT Pub. No.: WO2013/158945
PCT Pub. Date: Oct. 24, 2013

(65) Prior Publication Data
US 2015/0352520 A1 Dec. 10, 2015

Related U.S. Application Data

(60) Provisional application No. 61/635,335, filed on Apr. 19, 2012.

(51) Int. Cl.
| | | |
|---|---|---|
| *B01J 20/26* | (2006.01) | |
| *B01J 20/22* | (2006.01) | |
| *B01J 20/32* | (2006.01) | |
| *B01J 20/30* | (2006.01) | |
| *C08J 3/24* | (2006.01) | |
| *C08J 7/04* | (2006.01) | |

(52) U.S. Cl.
CPC .......... *B01J 20/267* (2013.01); *B01J 20/223* (2013.01); *B01J 20/3014* (2013.01); *B01J 20/3078* (2013.01); *B01J 20/3208* (2013.01); *C08J 3/24* (2013.01); *C08J 3/245* (2013.01); *C08J 7/04* (2013.01); *C08J 2333/02* (2013.01); *C08J 2333/26* (2013.01); *C08J 2403/06* (2013.01)

(58) Field of Classification Search
CPC .... B01J 20/267; B01J 20/223; B01J 20/3014; B01J 20/3078; B01J 20/3208; C08J 3/24; C08J 3/245; C08J 7/04; C08J 2333/02; C08J 2403/06; Y10T 428/2982
USPC ........................................................ 428/403
See application file for complete search history.

(56) References Cited

U.S. PATENT DOCUMENTS

| | | | | |
|---|---|---|---|---|
| 4,116,899 A | * | 9/1978 | Fanta | A61L 15/60 524/13 |
| 5,788,684 A | * | 8/1998 | Abuto | A61F 13/532 604/358 |
| 2008/0177057 A1 | * | 7/2008 | Bolduc | A61L 15/28 536/123.1 |
| 2010/0057027 A1 | * | 3/2010 | Furno | A61L 15/60 604/367 |
| 2011/0297185 A1 | * | 12/2011 | Godin | A61L 15/28 134/6 |

* cited by examiner

Primary Examiner — Leszek Kiliman
(74) Attorney, Agent, or Firm — Mark W. Roberts

(57) ABSTRACT

A dual-surface treated composite superabsorbent particle comprising a polycarboxylate polymer (e.g., saponified polyacrylamide) and a carboxylated starch polymer is disclosed. The surface of the particle is cross linked through esterification with a $C_2$-$C_4$ polyol exemplified with glycerol. In addition, the surface region is crosslinked through ionic bonds with a trivalent metal ion exemplified with aluminum. In a critical method of making, the acidification of the surface with the polyol occurs prior to treatment with the trivalent metal ion, which results is a hybrid particle that can include up to about 40% of carboxymethyl starch yet exhibit a FSC of at least 47 g/g, a CRC of at least 27 g/g, an AUL of at least 18 g/g under a load of 0.7 psi, and a SFR of at least 180 ml/min. Also disclosed is a method of making that includes a surface esterification prior to aluminum treatment.

14 Claims, 4 Drawing Sheets

COMPOUNDED SURFACE TREATED CARBOXYALKYLATED STARCH POLYCRYLATE COMPOSITES

CLAIM OF BENEFIT OF PRIORITY

The present application claims benefit of priority of International Application No. PCT/US13/37274, filed Apr. 19, 2013, which itself claims priority to U.S. Provisional Patent Application No. 61/635,335, filed Apr. 19, 2012, each of the contents of the entirety of which are incorporated by this reference.

BACKGROUND

Super absorbent polymers (SAPs) are the principle absorbent materials used to absorb physiological solutions in diapers, feminine hygiene and adult incontinence products. The majority of SAPs in commercial use are particles consisting of polyacrylate polymers derived from acrylic acid, which is made from petroleum. Polyacrylate based SAPs have outstanding absorbency properties, the most important of which are Free Swell Capacity (FSC), which is a measure of the grams of a standardized solution that can absorbed per gram of particles. Centrifuge Retention Capacity (CRC), which is a measure of how many grams of solution remain absorbed by the particles when placed under centrifugal force under standardized conditions of force and time, and Absorbance Under Load (AUL), which is a measure of the grains of a standardized solution that can be absorbed per gram of particle while the particles are subject to a standardized compression, load (typically 0.7 Psi), which mimics the effects of a person's weight on the absorbent product. The standardized solution used to measure these properties is 0.9% saline (NaCl), which has an osmolarity that mimics physiological solutions such as urine and blood. To be a commercially effective SAP, the particles should demonstrate minimum values of about 30-40, 25 and 15-18 in g/g for FSC, CRC and AUL, respectively, for the saline solution.

Another important absorbency property of SAPs is the rate at which a standardized amount of the standardized solution can permeate through a standardized amount of the SAPs in a standardized test. Various manufacturers use different tests for this fluid How property and may refer to it as Gel Bed Permeability (GBP) or Saline Flow Conductivity (SFC). In the description that follows a similar test called Saline Flow Rate (SFR) is used to measure the flow of 0.9% saline in a standardized apparatus filled with test SAPs. Permeability is important for SAPs because even though particles may have outstanding FSC, CRC, and AUL properties, the rapid swelling of the initially contacted particles can cause gel block, which is a damming effect that, slows the flow of the solution to subsequent particles.

Polyacrylate derived SAPs have two disadvantages from an ecological perspective. First, they are derived from non-renewable petroleum resources. Second, they are not biodegradable because few, if any natural soil organisms can digest the polyacrylate backbone of the polymer. Accordingly, efforts have been made to find ways to utilize natural polysaccharide polymers as outright substitutes or as amendments for conventional SAP to reduce the amount of polyacrylates used in the products. The most useful polysaccharides in this regard are those that have a backbone substituted with ionic (polar) substituents, such as alkylcarboxylate or amine groups. Amine groups occur naturally in some polysaccharides, such as chitosan, while carboxylate groups must be artificially added to the most abundant polysaccharides, cellulose and starch, using carboxy alkyl donating reagents. The most common carboxyalkylated polysaccharides are carboxymethyl cellulose (CMC) and carboxymethyl starch (CMS). Several attempts have been described to use such polysaccharides as outright substitutes for polyacrylates SAPs or as grafts or copolymers that may be used in conjunction with conventional SAPs.

U.S. Pat. No. 4,116,899 discloses compositions made from hydrolyzed polyacrylonitrile (H-PAN) mixed with starch. The gels formed of the combination of these materials blended together were dried and heated. It was discovered that starch and H-PAN reacted together upon heating resulting in a composition that had increased water absorbency over either alone. The reaction would likely form cross links between the starch and the H-PAN by inter esterification between the starch molecules and H-PAN. No surface treatment or other cross linking of the gels is disclosed nor proposed.

U.S. Pat. No. 5,409,771 discloses cyclic carbonate surface treatment of conventional polyacrylate SAPs and mentioned the possibility of incorporating ordinary starch with the polyacrylates. However, there is no teaching of actual production of such a combination or the properties that might be obtained thereby.

U.S. Pat. No. 4,483,950 describes use of modified starches as extenders for polyacrylate based SAPs. It was discovered that adding white dextrin to polyacrylate gels increases their absorptive performance. In fact, the hybrid SAP was a starch-graft-H-PAN made by saponifying the polyacrylate and blending it with white dextrin in solution. The blended materials formed gels with increased FSC by up to 14%. No surface treatment or any other cross linking of the gels is disclosed.

U.S. Pat. No. 4,883,478 discloses SAP formulations combined with mono or oligosaccharides. Polyacrylate SAPs were mixed, in the gel form, with saturated solutions of sucrose or corn syrup, which is a blend of glucose, some maltose and low molecular weight oligosaccharides. The amounts of sucrose in the polyacrylate blend mixture was quite high, reaching even 90%. It was disclosed that solutions of sucrose and the SAP could be mixed with an extruder. Then, the mixture was dried and ground into particles. The patent disclosed that with only 20% SAP (Sanwet) and 80% sucrose, they were able to obtain particles having a CRC value of 41.5 g/g.

U.S. Pat. No. 4,693,713 describes mixtures of a cross-linked SAP and monosaccharides or oligosaccharides. It was claimed that this mixture of water soluble compounds increased blood absorption. Generally, the SAP sugar ratio ranged from 3:1 to 5:1. It was mentioned that, polycarboxylic acids might be useful to cross link to with SAPs to CMC or CMS. This document does not disclose any other features of the cross linked SAP's obtained.

U.S. Pat. No. 6,765,042 discloses that CMC or CMS could be cross linked using a bifunctional cross linking agent and then dried and ground into particles that would have superabsorbent properties.

U.S. Patent Application Publication No. 2008177057 discloses that CMS particles prepared by reactive extrusion to form a gelatinized or pregelatinized mass and subsequently subjected to surface treatment in the presence of an acid and heat would form superabsorbent particles having useful FSC, CRC, and AUL values of at least 30, 20 and 15 in g/g respectively. It was disclosed that the acid may be a bifunctional group cross linking acid such as citric acid or succinic acid, or could be a non-crosslinking organic acid or even a non-crosslinking mineral acid such as hydrochloric acid, which appeared to cause formation of intramolecular cross links at the surface of the CMS particle. Godin et al. in WO App. 2010/096742 describe, similar results. While particles such as these exhibit FSC, CRC, and AUL properties similar to conventional polyacrylate SAPs, these CMS and CMC particles suffer from severe gel block problems which limits their use as a substitute for polyacrylate SAPs. Such particles demonstrate a SFR of less than 5-10 ml/min/g. By comparison, high tier polyacrylate derived SAPs usually have a SFR of more than 140 ml/min/g.

U.S. Patent Application Publication No. 2010/0057027 (WO 07/098932) discloses hypothetical superabsorbent particles made by combining polyacrylate materials and starch compounds, including CMS, pregelatinzed starches or other modified starches or combinations of different starches, where the maximum starch content is 30%, or 20% or 15% of the particle, the remainder being the polyacrylate material. The document disclosed generalized hypothetical combinations, whereby, powdery starch compounds may be mixed with the polyacrylate materials before, during, or after polymerization of the polyacrylate, or before, during or after drying of the polyacrylate, or before, during, or after a surface treatment of the polyacrylate with heat and cross linking agents to form cross links. The document proposed, cross linking the starch and the polyacrylate in the presence of one or more types of cross-linkers, a multi-arm cross-linker and a linear cross-linker. A hypothetical list of potential cross linkers includes diethylene glycol, triethylene glycol, polyethylene glycol glycerol polyglycerine, propylene glycol diethanolamine, triethanolamme, polyoxypropylene, oxyethyleneoxypropylene-blockcopolymers, sorbitan acid esters, polyoxyethylenesorbitan acid esters, trimethylolpropane, pentacrythritol, polyvinylalcohol, sorbitol, 1,3-dioxolan-2-one (ethylenecarbonate), 4-methyl-1,3-dioxolan-2-one (propylencarbonat), 4,5-dimethyl-i,3-dioxolan2-one, 4,4-dimethyl-1,3-dioxolan-2-one, 4-ethyl-1,3-dioxolan-2-one, 4-hydroxymethyl-1,3dioxolan-2-one, 1,3dioxan-2-one, 4-methyl-i,3-dioxan-2-one, 4,6-dimethyl-i,3-dioxan-2-one. Surface treatment of the cross linked particles with either aluminum ions or oxazolidone is also proposed. The document fails to disclose and does not propose, any conditions for making a composite polyacrylate starch particle having a starch content of greater than 30% wt that would have a FSC, CRC, and AUL of greater than 40, 25, and 18 in g/g respectively, while at the same time retaining a SFR greater than 50 ml/mm or in the range of conventional SAP particles.

Fürno et al. in WO 2007/098932 describes graft-copolymers of carboxymethyl starches, however, the starch content in Fürno et al. was limited to 30% max. Moreover performances, especially in GBP (the near equivalent of SFR) were not as high as current SAPs.

Despite a long history of experimentation with combinations of starch and polyacrylate polymers for use as SAPs, there still is a need in the art to provide a SAP that has a high biobased content, and that has sufficient FSC, AUL and CRC properties in addition to sufficient SFR to be useful as a substitute for ordinary SAPs in absorbent products. The present disclosure addresses these problems and others, and provides further advantages that one of ordinary skill in the art will readily discern upon reading of the following non-restrictive description that follows.

The present disclosure refers to a number of documents, the content, of which is herein incorporated by reference in their entirety.

SUMMARY OF THE INVENTION

According to an aspect, the present disclosure pertains to a composite superabsorbent material comprising a particle that is blend of a carboxyalklated polysaccharide and a synthetic polycarboxylate polymer having a surface that is dual-surface crosslinked via formation of esters through a $C_2$-$C_4$ polyol and with a trivalent metal salt.

According to an embodiment, the composite superabsorbent particle comprises a synthetic polycarboxylate polymer able to form an hydrogel blended with a carboxyalkylated starch, and further including a $C_2$-$C_1$ polyol moiety crosslinking at least one of the carboxyalkylated starch and the synthetic polycarboxylate polymer via ester linkages at the surface of the particle; and a trivalent metal ion coating the surface of the particle; wherein a ratio of the synthetic polycarboxylate polymer to the carboxyalkylated starch is from about 20:80 to about 80:20 on a wt.:wt. basis and the amount of the ester linkages and trivalent metal salt is such that the particle exhibits a FSC of at least 40 g/g, a CRC of at least 25 g/g, an AUL of at least 15 g/g under a load of 0.7 psi, and a SFR of at least 25-50 ml/min with 0.9% saline.

In various more particular embodiments, the composite particle comprises, a carboxyalkylated starch content ranging from greater than 20% to 80% wt/wt of the particle; a synthetic polycarboxylate polymer ranging from less than 70% to 55% wt./wt. of the particle; a surface region comprising ester linkages between at least one of the carboxyalkylated starch and the synthetic polycarboxylate polymer and ionic cross links with a trivalent metal ion. Such particles are characterized by having a core region and surface region, wherein the surface region of the particle has a higher concentration of the ester linkages and ionic cross links with the trivalent metal than the core region; and wherein the particle exhibits a FSC of at least 40 g/g, a CRC of at least 25 g/g, an AUL of at least 15 g/g under a load of 0.7 psi, and a SFR of at least 50 ml/min with 0.9% saline.

In certain embodiments, the particles exhibits a FSC of at least 40 g/g, a CRC of at least 25 g/g, an AUL of at least 15 g/g under a load of 0.7 psi, and a SFR of at least 60-120 ml/min with 0.9% saline, in other embodiments, the particles exhibit a FSC of at least 40 g/g, a CRC of at least 27 g/g, an AUL of at least 18 g/g under a load of 0.7 psi, and a SFR of at least 180 ml/min. In particularly desirable embodiments, the particles exhibit a FSC of at least 47 g/g, a CRC of at least 27 g/g, an AUL of at least 18 g/g under a load of 0.7 psi, and a SFR of at least 180 ml/min.

In certain embodiments the trivalent metal ion comprises aluminum. In exemplary embodiments the aluminum is in the form of aluminum sulfate. In exemplary embodiments the carboxyalkylated polysaccharide is carboxymethyl starch, in exemplary embodiments the $C_2$-$C_4$ polyol comprises glycerol. In other embodiments the $C_2$-$C_4$ polyol may include ethylene glycol or propylene glycol.

In an embodiment, the carboxyalkylated polysaccharide is carboxymethyl starch, the $C_2$-$C_4$ polyol is glycerol, and the ratio of the synthetic polycarboxylate polymer to the carboxyalkylated starch is about 60:40 on a wt.:wt. basis. In broader embodiments the ratio of synthetic polycarboxylate polymer to carboxyalkylated starch is from <70-80:>20-30 up to 55:45. A ratio of about 60:40 or 65:35 is contemplated as desirable embodiments.

In exemplary embodiments, the synthetic polycarboxylate polymer able to form hydrogel is a saponified polyacrylamide. Typically, the saponified polyacrylamide has a saponification degree of at least 30-60%. In other exemplary embodiments the saponification is to a degree of about 70%

In another aspect, the present disclosure relates to a method of making a composite superabsorbent particle comprising the sequential steps of: kneading a carboxyalkylated starch with a synthetic polycarboxylate polymer hydrogel to form a composite gelatinous mass; drying the composite gelatinous mass; forming particles from said dried composite mass; forming ester linkages on the surface of the particle; coating the particle surface with a trivalent metal ion; and heating the particle to a temperature and for a time to form a particle that exhibits a FSC of at least 40 g/g, a CRC of at least 25 g/g, an AUL of at least 15 g/g under a load of 0.7 psi, and a SFR of at least 25-50 ml/mm with 0.9% saline.

In an exemplary practice the step of forming esters on the surface of the particle comprises coating the formed particles with a $C_2$-$C_4$ polyol: and contacting the surface of the particle with a non-cross linking acid. In an exemplary practice the non-cross linking acid is hydrogen chloride. In a desirable practice, the step of contacting with the non-cross linking acid is performed by permeating the particle with an acidic gas. The acidic gas may be hydrogen chloride. In another practice, the step of contacting with the non-cross linking acid is performed by coating the particle with an acidic liquid. In such cases, in certain embodiments the contacting with the liquid acid performed in an aqueous solution that contains a water miscible organic solvent. An exemplary water miscible organic solvent is methanol.

In exemplary practices, the non-cross-linking acid is hydrochloric acid and the $C_2$-$C_4$ polyol is glycerol. In other practices the $C_2$-$C_4$ polyol may include ethylene glycol or propylene glycol. In a particular practice, the carboxyalkylated polysaccharide is carboxymethyl starch, the $C_2$-$C_4$ polyol is glycerol, and the ratio of the synthetic polycarboxylate polymer to the carboxyalkylated starch is about 60:40 on a wt.:wt. basis. In the same particular embodiment the trivalent metal ion is aluminum. The aluminum may be provided in the form of an aluminum salt, exemplified with aluminum sulfate.

In other exemplary embodiments of the method, the synthetic polycarboxylate hydrogel is saponified polyacrylamide. The saponified polyacrylamide is characterized by a saponification degree of at least 30%. In an exemplary embodiment the degree of saponification is about 70%.

Another embodiment of the process is a method of making a composite saponified polyacrylamide:carboxyalkyl starch particle comprising the sequential steps of: blending a polymerized saponified polyacrylamide hydrogel with an aqueous solution or hydrogel of a carboxymethyl starch to form a gelatinous admixture wherein the carboxymethyl starch comprises at least greater than 30% and the polyacrylamide is 20% to less than 70-80% of the weight of the blend excluding the aqueous solution and any soluble components thereof; drying the gelatinous admixture to a moisture content of less than 10% forming a dried composite powder from the admixture; grinding the dried composite powder to form composite particles of a size of 20-100 mesh; contacting a surface of the dried composite particles with a first solution containing a $C_2$-$C_4$ polyol and with a non-cross-linking mineral acid forming an acidic polyol coated composite material: evaporating the solvent of the solution of polyol/acid; forming a surface cross-linked composite particle; contacting the surface crosslinked composite particles with a second solution comprising a trivalent metal salt; evaporating the solution of the trivalent metal salt. Then the composites are heated at a temperature of 100-190° C. for a time sufficient to form ester cross-links between the polyol, the carboxymethyl starch and the saponified polyacrylamide and develop ionic linkages forming dual surface crosslinked composite particles. (Moisture content is relevant, before the treatment as the acid needs some water to change carboxylate into carboxylic species.) The particle having a ratio of the saponified polyacrylmide to carboxyalkylated starch from 20:80 to 7.0:30 on a weight:weight basis and the amount of the ester linkages and trivalent metal salt is such that the particle exhibits a TSC of at least 40 g/g, a CRC of at least 25 g/g, an AUL of at least 15 g/g under a load of 0.7 psi, and a SFR of at least 50 ml/min with 0.9% saline.

In certain embodiments, the first solution containing the $C_2$-$C_4$ polyol and non-cross-linking mineral acid further includes at least a water miscible organic solvent. In certain embodiments, the second solution containing the trivalent metal salt includes also includes a water miscible organic solvent. In particular embodiments, the water miscible organic solvent is methanol. In particular embodiments, this blending occurs without exerting shear forces on the mixture.

Without depending on the structural description above, a further aspect of the present invention is a method of making the composite superabsorbent synthetic polycarboxylate polymer (e.g., saponified polyacrylamide): carboxyalkyl polysaccharide particles in which the coating with the $C_1$-$C_4$ polyol and acid occurs prior to the cross-linking with the trivalent metal ion.

The particles are made by blending a synthetic polycarboxylate polymer (e.g., saponified polyacrylamide) with an aqueous solution of a carboxyalkyl polysaccharide to form a gelatinous admixture wherein the carboxyalkyl polysaccharide comprises at least 29% of the weight of the blend; the remaining weight percentage being the saponified polyacrylamide particle, excluding the aqueous solution and any soluble components thereof. The saponified polyacrylamide polymer may be pre-polymerized, or polymerized from monomers in the presence of the carboxyalkyl polysaccharide to form the gelatinous admixture. The gelatinous admixture is dried to a moisture content of less than 10% forming a dried composite powder wherein the carboxyalkyl polysaccharide. The aqueous solution may optionally contain a water miscible organic solvent. The dried composite powder are ground and sized to form composite particles of a size of 20-100 mesh. The particles are coated with a solution containing a $C_2$-$C_4$ polyol in water, a water miscible organic solvent and with a mineral acid forming an acidic polyol coated composite material. These components may be applied together in one solution or separately in different steps. The acidic polyol coated composite material is dried at a temperature ranging front 60-70° C. The dried composite particles are further coated by contact with a second solution comprising a trivalent metal and a second water miscible organic solvent. The second water miscible organic solvent is removed, retaining a solid material comprising trivalent metal dual coated composite particles. These are heated at a temperature of 100-190° C. forming dual crosslinked composite particles. The dual crosslinked composite particles are dried to a moisture content of less than 10%. Moisture content is important before, as there's no drying after heat treatment, since the composite is dehydrated to allow the esterification reaction. (Afterwards, the composite will be anhydrous, and may require to be rehydrated to avoid static.) The composite saponified polyacrylamide: carboxyalkyl polysaccharide particle having a core region and surface region, wherein the surface region has more ester cross links and trivalent metal ionic crosslinks on the surface region than in the core region, and wherein the particles exhibit a minimum SFR of at least 50 g/min.

BRIEF DESCRIPTION OP THE DRAWINGS

Figure 3:
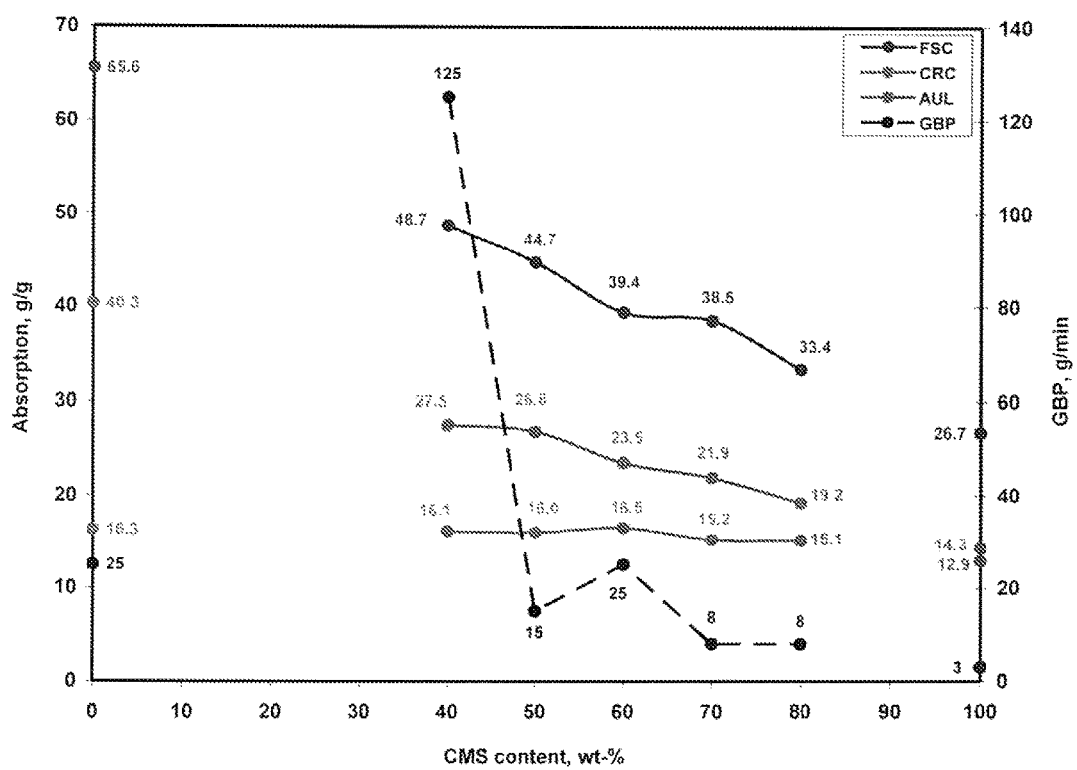

FIG. 3 is a chart illustrating absorbency performance parameters for a composite polycarboxylate polymer: carboxyalkyl polysaccharide particle made with CMS and saponified polyacrylamide (CMS/PAAm70) cross linked with glycerol at different weight ratios of CMS to polyacrylamide and further coated with aluminum sulfate under the same surface treatment conditions (glycerol: (1.00 wt-%): HCl (1.20 wt.-%); $Al_2(SO_4)_3$ (1.00 wt-%); 11 mm of IR 140° C.

Figure 4A:
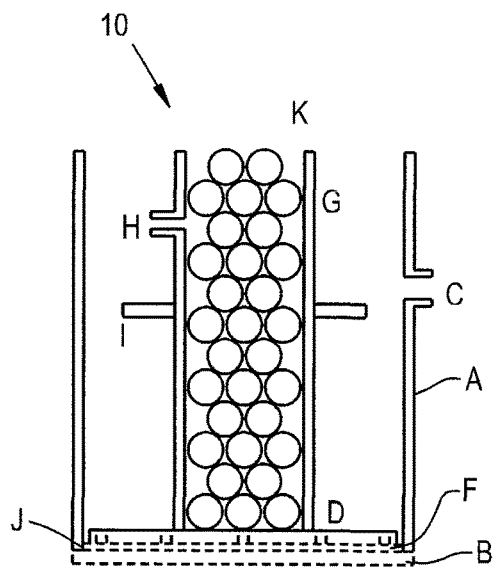
Figure 4B:
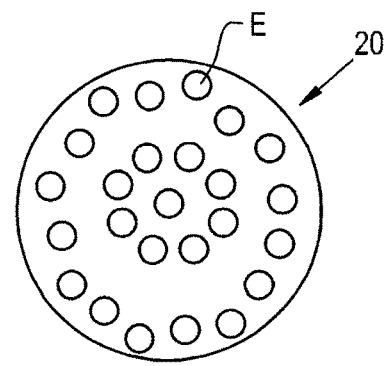

FIG. 4 is an illustration of a device for measuring Saline Flow Rate as described in more detail in the Test Methods section under Examples hereinafter.

DETAILED DESCRIPTION OF THE INVENTION

Section I.—Definition

In order to provide a clear and consistent understanding of the terms used in the present specification, a number of definitions are provided below. Moreover, unless defined otherwise, all technical and scientific terms as used herein have the same meaning as commonly understood by one of ordinary skill in the art to which the present disclosure pertains unless there is an irresolvable conflict between an asserted common meaning and the meaning understood from the present disclosure, in which, ease the meaning understood from the present disclosure is intended.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

The words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

"About" with respect to a value means within the degree of error of an instrument that commonly would be used by one of ordinary skill in the art to measure the value in the context of this disclosure, and more particularly, within a range of the stated value where no discernible function or property would differ from the function or property exhibited precisely at the stated value. In non-limiting embodiments for various parameters, the term may be within 10%, within 5%, within 1%, and in some cases within 0.5% of the stated value.

"Absorption Under Load" (AUL), at 0.7 psi (5 kPa), also known in the art as "Absorption Against Pressure" (AAP) or "Absorption Under Pressure" (AUP) refers to the amount (g) of a defined fluid absorbed per gram of the composition under a given applied pressure. A standard defined fluid is a saline solution (0.9% Weight/Weight NaCl solution). The standard method for determining AUL is WSP 242.2 (05) A from Worldwide Strategic Partners (EDANA-INDA). This represents the ability of a superabsorbent to swell in saline solution 0.9% while under a piston exerting a pressure of 0.7 Psi.

"Carboxyalkyl starch" refers to an amy lose and/or amylopecticin starch substance having carboxyalkyl moieties substituted for hydroxyl or aldehyde groups on at least some sugar residues comprising the backbone of the polysaccharide.

"Centrifuge Retention Capacity" (CRC) also called "Retention", refers to the amount (g) of fluid retained per gram of the composition, following exposure of the composition to a centrifugation force of 250 g. The method used is WSP 241.2 (05).

"CMS" refers to carboxymethyl starch.

"Free Swell Capacity" (FSC), also known in the art as "Total Absorption", refers to the amount (g) of fluid absorbed per gram of the composition. The standard method used is WSP 240.2 (05) A from Worldwide Strategic Partners (EDANA-INDA). This represents the ability of a superabsorbent to swell in saline solution. The absorbent materials ace placed in pre-weighted tea bags and weighted before and after swelling in solution of 0.9% saline.

"Gelatinous admixture" refers to an amorphous hydrogel formed by blending two or polymeric materials together (i.e., a polycarboxylate polymer (e.g., saponified polyacrylamide) and a carboxyalkylated starch) in the presence of an aqueous solution that may or may not optionally include a water miscible organic solvent. Such gelatinous admixture may be made by blending prepolymerized polymers or by polymerizing a solution of polyacrylamide or saponified polyacrylamide monomers in the presence of a solution or slurry of the carboxyalkylated starch.

"Hydrogel" refers to a semisolid material composed of a network of solid polymeric material interpenetrated with the aqueous solution.

"Moisture content" refers to the amount of water (% w/w) contained in a solid or semisolid material.

"Non-crosslinking acid" refers to an acid that donates hydrogen ions that may act to catalyze a chemical reaction between oilier chemical species but where the hydrogen donating component of the acid itself does not react to from a bridge that crosslinks the other chemical species. Suitable examples include monoprotic mineral acids and organic acids, exemplified herein with HCl.

"Particle conductivity" or carboxyalkyl starch conductivity" or "CMS conductivity" refers to its conductivity in a 1% slurry in deionized water.

"Particle pH" or "carboxyalkyl starch pH" or "CMS pH" in reference to carboxyalkyl starch particles or polycarboxylate polymer (e.g., saponified polyacrylamide) particles alone, refers to the pH of a slurry of 10% particles in deionized water. With reference to composite particles, particle pH refers to the pH of a 1% wt./wt. slurry of the particles in deionized water.

"Particle size" refers to the largest dimension of a particle. The particle size can be directly determined using sieving methods, optical or scanning electron microscopes as well as by other well-known methods. Particle size is equivalent in meaning to the diameter of the particle if the particle were perfectly spherical or the length of the particle if oblong. The term refers to the average largest size when used in reference to a population of particles such as in a powder.

"Particles" or "Discrete Particle(s)" refers to solid or semisolid particulate matter, including hydrogels, in a discrete divided state.

"Percent" or "%" with respect to a material refers to a percentage by weight (i.e. % wt/wt), unless otherwise specified.

"Polyacrylate polymer" refer to any material derived from acrylic acid monomers, derivatives of acrylic acid monomers, and derivatives of the same that have been polymerized into strands or a matrix, with or without cross linking agents. Slaving free carboxylate or carboxylic acid groups and that are able to form a hydrogels in water. Typically, polyacrylate polymers are obtained by radical polymerization of alpha unsaturated amides, acrylic acids, salts, esters, nitrile or amides thereof. Polyacrylate polymers can be made from polyacrylamide, for example by saponification of the polyacrylamide to yield free carboxylate groups. Non-limiting examples of such are polymers polymerized from acrylic acid, acrylate salts, acrylamide, acrylonitrile, acrylate esters and methacrulates. Typical but non-limiting examples of polymers include polyacrylic acid, saponified polyacrylamides, and copolymers thereof. Saponified polyacrylamide also may refer to saponified copolymers of polyacrylamide.

"Powder" refers to a collection of particles in a dried state where the liquid content thereof is less than 20% wt./wt.

"Saline Flow Rate" (SFR) also called "permeability" refers to the flow rate (ml/min•g) of saline solution through one gram of swollen superabsorbent particles under an applied pressure of 2.07 kPa (0.3 Psi) as illustrated by the method described hereafter.

"Saline-Solution" refers to a 0.9% (wt/wt) sodium chloride solution in deionized water "Superabsorbent", "superabsorbent polymer" or "SAP" refers to absorbent materials capable of gel forming upon contacting with a liquid such as water, aqueous solutions, saline, or physiological fluids. Such materials are characterized by a Centrifuge Retention Capacity (CRC) of at least 15 g/g.

"Surface Crosslink", "crosslinked surface" and the like refers to the presence of intermolecular or ionic bonds between residues of a polymer formed into a particle that are more prevalent at the surface region of a particle than in the core region of the particle. In a similar vein "surface treatment" refers to a process that results in a greater affect at the surface region of a particle than in the core region.

"Surface," "surface region" and the like, with respect to a particle refers to the exterior or outermost aspects of a particle in contrast to "core" or "core region" that refers to the interior or innermost aspects of the particle. Although there is not a definable boundary line differentiating the surface region from the core region, where there are differences in chemical structure between the surface and the core (such as greater ester bonds or crosslinking on the surface), such differences will be evident by the existence of a gradient of those structures occurring in higher amounts per weight in sections from the outer aspects of the particle in comparison to sections from the inner aspects.

Section II.—Description

Turning now to a more detailed description, disclosed herein is a specialty type of polycarboxylate polymer: carboxyalkyl polysaccharide composite particle that has enhanced superabsorbent properties (FSC, CFR, and AUL) and greatly improved saline flow rates (SFR, the latter of which has been a bane to using starch and other polysaccharides and their derivatives to displace potyacrylates in superabsorbent material applications. In contrast to the known art, the carboxyalkylated polysaccharide component of the composite parties can be blended in up to a 45:55 weight ratio carboxylated polysaccharide:polycarboxylate polymer (e.g., saponified polyacrylamide) material without sacrificing commercially desirable SFR performance properties. Other embodiments, however, may use higher or lower ratios of carboxylated polysaccharide:polycarboxylate polymer and still obtain useable composites.

The invention is illustrated with carboxymethyl starch but any kind of carboxyalkylated starch or cellulose may be used. The composite particles can have a weight ratio of carboxyalkyl polysaccharide:polycarboxylate polymer of 10:90 to 80:20. In preferred embodiments exemplified using CMS, the highest amount of CMS still giving commercially preferable absorbance and SFR properties has a weight ratio CMS:polycarboxylate polymer in the range of <30:70 to 45:55, with embodiments having a ratio of about 35:65 being most preferred.

Any carboxyalkylated polysaccharide with a degree of substitution of least 0.5 can be used. As used herein "degree of substitution" is defined as the average number of carboxyalkyl groups per sugar residue in the polysaccharide. Carboxyalkyl cellulose and carboxyalkyl starch are the most suitable polysaccharides. Of these, carboxymethyl cellulose (CMC) and carboxymethyl starch (CMS) are preferred, and most preferred is CMS, with which the invention is exemplified. CMS provides osmotic force, but also enough coulombic repulsion forces to achieve high AUL values when formed into particles. Moreover, CMS contains many hydroxyl groups so it provides gel coherence and ample hydroxyl groups to form ester linkages.

Carboxyalkyl functionality may be easily grafted onto starch via ether linkages under a Williamson ether synthesis. This may be readily done with reagents containing leaving groups bearing haloacids and salts thereof. Non-limiting examples of such haloacids are $C_2$-$C_5$ haloacids, such as monochloroacetic acid. Non-limiting examples of salts thereof are alkali metals salts of haloacetic acids, such as sodium monochloroacetate. Where possible, carboxyalkylating agents based upon renewable resources are most desirable as they would increase the biobased content of the composite.

Suitable starches may be characterized as being an at least partially branched glucose polymer having 1-4 and 1-6 alpha glycosidic linkgages and molecular weight of at least 500,000 g/mol. Naturally occurring starch is typically comprised of polymers in amylose and amylopectin forms, the later having a higher degree of branching and having more absorbency than amylose when formed into particles. Nonetheless, high amylopectin starch is not required and any naturally occurring or fractionally purified forms of starch may be used. Suitable starches may come from many botanical origins. Including without limitation, corn, wheat, potato, yam, cassava, rice, millet, sorghum, barley, oats, beans, favas, peas, lentils, buckwheat, bananas, arracacha, coca, sago, taro, sweet potatoes and waxy species thereof and mixture thereof. Waxy species have a higher proportion of amylopectin than non waxy species. Among waxy starch sources, waxy corn, potato, cassava and wheat are especially contemplated.

Among the methods of making carboxyalkylated starches, starches that are carboxyalkylated when dispersed in an alkaline aqueous medium are most desirable although not required. Without being bound to any theory it is believed that carboxyalkylating agents, catalysts and starch chains are more labile in aqueous environment. Starch structure is more easily penetrated by hydroxides and carboxyalkylating agents during gelatinization. This gives the resulting effect that the carboxyalkyl groups are more evenly substituted over the glucose residues, which provides for increased absorbent characteristics. A non-limiting example of aqueous alkaline medium is an aqueous solution characterized by a pH of at least 11.0. Such a pH can be achieved by dispersing an alkali hydroxide in water. Non-limiting examples of such hydroxides are sodium hydroxide, lithium hydroxide and potassium hydroxide. Typical moisture content in such aqueous alkaline medium used for the carboxylation range from 15% to 99%.

Carboxyalkylated starch purity is another important consideration. The carboxyalkylation reaction by itself may yield significant amounts of salts (typically sodium chloride), and other impurities. Any significant amounts of residual impurities may lead to "salt poisoning", which will cause performances reduction. To remove those salts it is therefore typical to perform a washing step. The carboxyalkyl starch can be washed with water and/or a water soluble organic solvent. Non-limiting examples of water soluble organic solvents include $C_1$-$C_4$ alcohols and $C_1$-$C_4$ alcohol/water mixtures. Among $C_1$-$C_4$ alcohols, methanol and more specifically, methanol/water mixtures are contemplated. Typically, carboxyalkyl starches will be considered purified when they will comprise less than 1% of salt and/or characterized by a 1% solution conductivity of at most 1,500 µS/cm In one exemplified form, the starch used was carboxyalkylated by reactive extrusion and purified by washing as described in Godin et al. WO App. 2010/096742. Such a product is available from the Archer Daniels Midland Company. Decatur, Ill. under the trade name "Bio-SAP" non-surface treated. The typical form of the carboxyalkylated starches used has a pH that ranges from 5.0 to 8.0 and most typically between 6.0 and 7. The pH adjustment can be performed before or during the washing stages of the production of the CMS.

Figure 1:
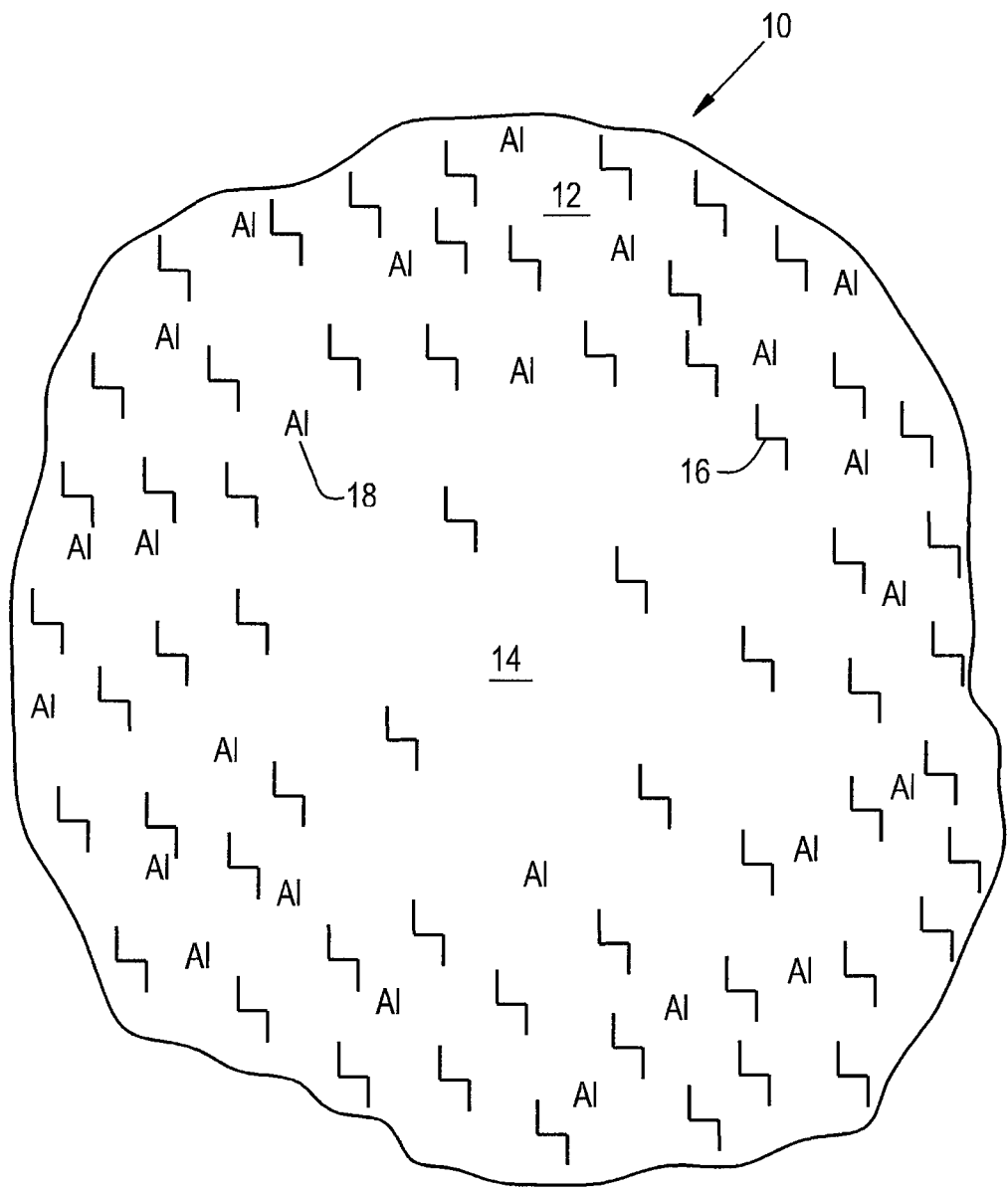
FIG. 1 illustrates a cross sectional view of the structure of a composite synthetic polycarboxylate polymer: carboxyalkyl starch superabsorbent particle 10 as described herein.

The general structure of the composite polycarboxylate polymer (e.g., saponified polyacrylamide): carboxyalkyl polysaccharide particles of the invention is illustrated by the cartoon cross sectional slice of such a particle made depicted in FIG. 1. The composite particle 10 has an outer surface layer 12 surrounding an inner core region 14. The carboxyalkylated polysaccharide (e.g., CMS) and the polycarboxylate polymer are partially covalently cross linked with intra and intermolecular ester linkages 16 between carboxylate groups and a $C_1$-$C_4$ polyol. Other free carboxylate groups are partially cross-linked through ionic linkages 18 with a trivalent metal ion such as aluminum. In the process of making, the composite particles are surface treated to form the ester 16 and ionic 18 cross links so that the ester cross links 16 and ionic cross links 18 are more concentrated at the surface layer 12 than the core region 12 of the particle 10.

As mentioned, herein above, in economically preferred embodiments, a ratio of the carboxylated polysaccharide to polycarboxylate polymer (e.g., saponified polyacrylamide) is from 45:55 to greater than 30:less than 70 on a wt/wt basis, although for other embodiments the carboxyalkyl polysaccharide to polycarboxylate polymer ration can be as low/high, respectively, as 10:90. Desirable composite particles exhibit, a FSC of at least 40 g/g, a CRC of at least 25 g/g, an AUL of at least 15 g/g under a load of 0.7 psi, and a SFR of at least 50 ml/min*g with 0.9% saline. More useful particles exhibit a FSC of at least 40 g/g, a CRC of at least 27 g/g, an AUL of at least 18 g/g under, a load of 0.7 psi, and a SFR of at least 180 ml/min. Most preferred composite particles exhibit a FSC of at least 47 g/g, a CRC of at least 2 g/g, an AUL of at least 18 g/g under a load of 0.7 psi, and a SFR of at least (80 ml/min.

The polycarboxylate or polyacrylate polymer may be any polyacrylic acid derived polymeric material having free carboxylate groups. More suitable polyacrylate materials include, for example, alkyl substituted polyacrylate derivatives, amino substituted polyacrylate derivates such as polyacrylamide, and derivatives thereof such as polymers formed with methacrylamide, alkyl-substituted (meth)acrylamides or aminoalkyl-substituted derivatives of (meth) acrylamide such as N-methylol(meth)acrylamide, N,N-dimethylamino(meth)acrylamide, dimethyl(meth)acrylamide or diethyl(meth)acrylamide. These polymers are typically formed using at least one acrylamide cross linking monomer, such, as N-methyl bisacrylamide. The important feature of the polyacrylate polymer is that it contains, or can be derivatized to display at least 50% carboxylate or carboxylic acid moieties. The performance of particles made using polyacrylamide cross linked with N-methyl bisacrylamide is exemplified herein, which were derivatized to convert at least about 30% of the amides to carboxylase groups by saponification with sodium hydroxide. Other methods of derivatization may also be employed so long as the polyacrylate polymer (e.g., saponified polyacrylamide) displays the desired amount of carboxylate or carboxylic acid moieties.

The $C_2$-$C_4$ polyol used to form the ester linkages 16 can be any form of a $C_2$ to $C_4$ carbon chain having at least two alcohol moieties. The $C_2$ to $C_4$ carbon chain may be saturated or unsaturated and may be branched or unbranched. Suitable examples include 1,2 ethane diol (ethylene glycol) 1,2 propanediol (propylene glycol), 1,3 propanediol, glycerol, 1,2 butanediol, 1,2, 3 butanetriol, 1,2,4 butanetiol, tert butyldiol, tert butyltiol, and erythritol. The performance of particles made using glycerol is exemplified herein; however similar performances are expected in other embodiments that use other $C_2$-$C_4$ polyols.

The concept of using a $C_2$-$C_4$ polyol to crosslink the surface of a composite polycarboxylate polymer (e.g., saponified polyacrylamide): carboxyalkyl polysaccharide arose from the inventors' observation that composite particles formed by merely blending a polycarboxylate polymer (e.g., saponified polyacrylamide) with CMS in the presence of HCl failed to produce a particle having suitable AUL performance after 15 minutes of heating at temperatures from 100-190° C. The HCl acid in the coating solution was intended to convert the carboxylate groups of the polycarboxylate polymer (e.g., saponified polyacrylamide) (—COONa) into carboxylic acid groups (—COOH) able to interact with the CMS hydroxyl groups (—OH) and to catalyze internal polysaccharide esterification between the acid groups and hydroxyl groups on the CMS and between the acid groups of the polycarboxylate polymer (e.g., saponified polyacrylamide) and the hydroxyl groups on the CMS surface. The inventors surmised that the low AUL obtained by only using HCl might be due to a deficiency of hydroxyl groups on the CMS surface proximate enough to carboxylic acid moieties on the CMS and polycarboxylate polymer (e.g., saponified polyacrylamide) to produce efficient esterification. This deficiency was cured by adding low molecular weight polyols that would provide at least two additional hydroxyl groups to form ester crosslinks between available acid groups on the CMS and polycarboxylate polymer (e.g., saponified polyacrylamide).

The combination of using a non-crosslinking mineral acid (e.g., HCl) and the low molecular weight polyol as part of the coating solution for the composite gave an unexpected effect on the AUL after heat treatment. The non-crosslinking mineral acid is provided to catalyze esterification between alcohol and acid moieties. It was predicted that even with efficient esterification, the AUL would decrease over that obtained with the polycarboxylate polymer (e.g., saponified polyacrylamide) alone because heat and acid treated CMS particles alone have a lower AUL than the polycarboxylate polymer (e.g., saponified polyacrylamide) alone. Accordingly, it was expected that as the ratio of CMS to polycarboxylate polymer (e.g., saponified polyacrylamide) rises, the resulting AUL of the composite particle (like the other absorbency parameters FSC and CRC) would be lower than the AUL of the polycarboxylate polymer (e.g., saponified polyacrylamide) particle in a calculable way illustrated by the dotted lines in FIG. 2. Indeed, the FSC and CRC parameters were reduced even below the predicted values with increasing ratios of CMS.

Figure 2:
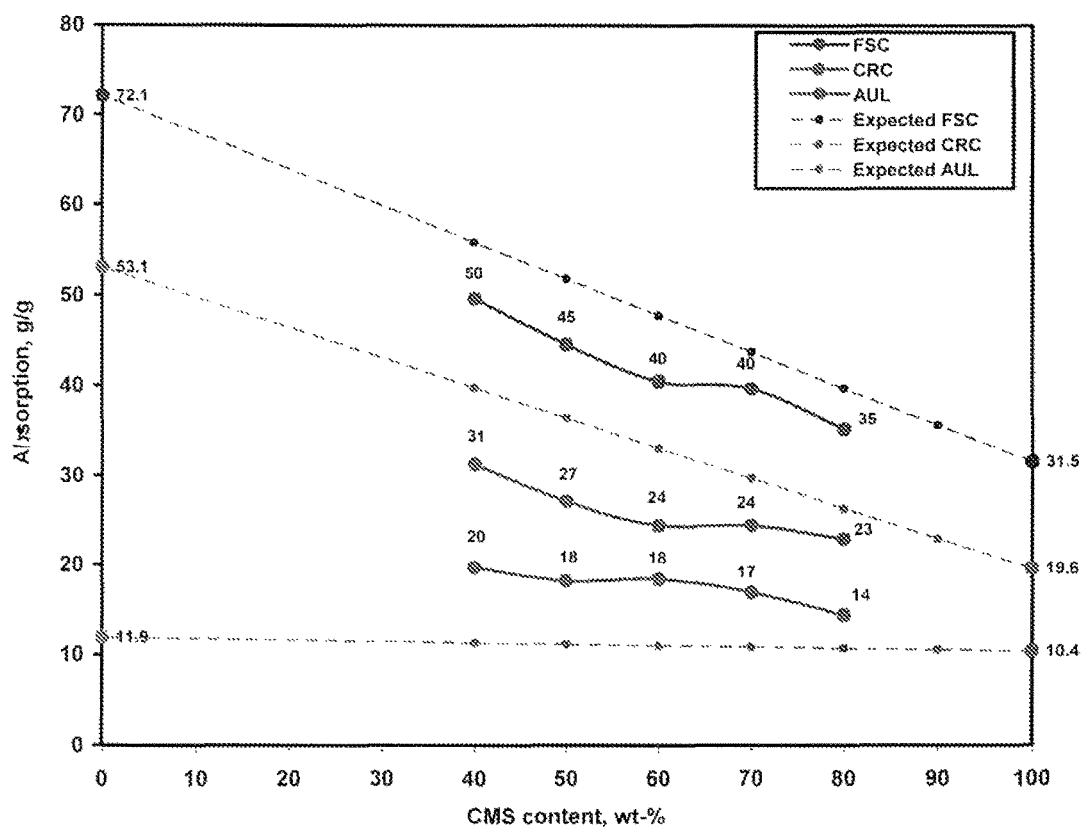
FIG. 2 is a chart illustrating absorbency performance parameters for a composite polycarboxylate polymer: carboxyalkyl polysaccharide particle made with carboxymethyl starch (CMS) and saponified polyacrylamide (CMS/PAAm70) cross linked with glycerol at different weight ratios of CMS to polyacrylamide and with the same surface treatment (glycerol, HCl, 10 min of IR 140° C.).

However, surprisingly, the AUL of the composite material actually increased synergistically over what, was predicted as shown by the actual measurements for AUL in FIG. 2. The AUL was greater for the composite than for the polycarboxylate polymer (e.g., saponified polyacrylamide) alone and was enhanced rather than reduced by the combination with CMS. Indeed, the AUL was increased by 4-5 points, compared to pristine polycarboxylate polymer (e.g., saponified polyacrylamide) or CMS components separately. Although increasing the CMS:polycarboxylate polymer (e.g., saponified, polyacrylamide) ratio in a composite particle from about 40:60 to about 80:20 did show a gradual decline in AUL, the composite particles still exhibited higher AUL values than the polycarboxylate polymer (e.g., saponified polyacrylamide) or CMS alone even at the highest measured ratio of about 80:20.

Unfortunately, however, the polyol cross linked composite particle exhibited unacceptably poor performance in SFR despite the reproducibly superior performance in AUL (see Table 1, Example 1). To address this problem, the inventors sought a solution that could improve the SFR performance, without jeopardizing the improved absorption performances achieved by the polyol cross linking. The solution was to dual cross link the carboxyalkylated surface of the particle by forming ionic cross links between free carboxylates using a trivalent metal salt. It was known in the art that aluminum sulfate in solution forms a trivalent aluminum ion ($Al^3$) that would coordinate via electrostatic interaction, with free carboxylate groups and could improve the absorbency performance of a carboxymethyl cellulose particles. The inventors surmised that such a treatment applied to a polyol crosslinked composite particle would improve the SFR properties of the particles without, adversely affecting the other absorbency performance parameters.

The same processes used to make and test the absorbency performance properties of the polyol cross linked particles with the properties shown in FIG. 2 were repeated, but with a further step of coating the particles with a solution of aluminum sulfate. The results shown in FIG. 3 demonstrate that, with composite particles having a CMS to polycarboxylate polymer (e.g., saponified polyacrylamide) ratio of about 40:60, the aluminum coated particles had a dramatically increased SFR of at least 125 ml/min. The SFR values, however plummeted rapidly when the CMS to polycarboxylate polymer (e.g., saponified polyacrylamide) ratio reached about 50:50 or more. The midpoint of the line between the 40% and 50% CMS corresponds to a CMS to polycarboxylate polymer (e.g., saponified polyacrylamide) ratio of about 45:55, which would form particles exhibiting a SFR of about 50 ml/min. Accordingly, any amount of CMS tip to about 40:60 ratio will have a SFR value of at least 125 ml/min. Even at a ratio of about 45:55 the SFR value is expected to be at least 50 ml/min*g. Composite particles having a carboxyalkylated polysaccharide to polycarboxylate polymer (e.g., saponified polyacrylamide) ratio of between about 20:80 and about 40:60 will also have a SFR value of at least 50 ml/min*g if not considerably higher.

Importantly, the inventor's further studies of aluminum coating of the starting materials alone (CMS particles or polycarboxylate polymer (e.g., saponified polyacrylamide) particles not in composite form) didn't respond in the same way as the composite, did after being surface treated in the same manner. That is, the aluminum coating was only beneficial to the SFR properties of the composite particles and had little beneficial effect on the SFR of either CMS or polycarboxylate polymers (e.g., saponified polyacrylamide) alone.

Another important and surprising discovery is that the sequence of forming the intermolecular ester cross-links 16 and the ionic aluminum cross links is critical for increasing the performance in SFR. The acidification/polyol coating must occur prior to the aluminum coating to have an advantageous effect. As shown in comparative Examples IV and IV, when the aluminum coating is done simultaneously with, the acidification and the polyol coating (Example IV) the resulting particles achieve similar FSC, CRC, and AUL properties to when the aluminum coating is done after the acidification/polyol coating (Example V) however, the substantial increase in SFR is not obtained unless the aluminum coating is done after the acidification/polyol coating (See Tables 1-3). Not to be bound by theory, it is believed that formation of ionic bonds with the aluminum blocks the free carboxylase groups from forming sufficient inter and intramolecular esters, or that acidification/polyol coating if applied first reduces the total amount of aluminum that will form ionic bonds to a level that is optimum for improving SFR. This implies some undefined optimal amount of aluminum, where the SFR is too small when there is too little aluminum (e.g., none), grows substantially when there is some optimum amount, but then is reduced again when there is too much.

The structure of the composite polycarboxylate polymer (e.g., saponified polyacrylamide): carboxyalkyl polysaccharide described above and illustrated in FIG. 1 is deduced from the method by which the particle is made, it is the combination of the particle's chemical composition and minimum FSC, CRC, AUL, and SFR properties that make it particularly suitable as a substitute or amendment to conventional polyacrylate superabsorbent absorbent particles. These properties result at least in part from the method by which the composite particles are made, whether or not the structure depicted in FIG. 1 adequately defines the distinguishing structural features of the particle. Accordingly, a better description of the composite particles may be understood by understanding, the method by which they are made.

The composite particle is made by blending a polycarboxylate polymer (e.g., saponified polyacrylamide) with an aqueous solution of a carboxyalkyl polysaccharide to form a gelatinous admixture wherein the carboxyalkyl polysaccharide comprises at least 10%, and optimally between 30% and 40% of the weight of the blend excluding the aqueous solvent and any other soluble components thereof. The blending may be done by using prepolymerized polycarboxylate polymers (e.g., saponified polyacrylamide) according to an embodiment. The blending should preferably be done in a manner that avoids imparting shear forces, for example, by agitation gentle stirring or kneading, in another embodiment, that, composite could be accomplished by dissolving acrylate based monomers in a solution of the carboxyalkyl polysaccharide and then polymerizing the monomers to form the gelatinous admixture in the form of a composite hydrogel.

The solution should be an aqueous solution but may include a water miscible organic solvent. To promote formation of the gelatinous admixture it is desirable that the total solids content of polycarboxylate polymer (e.g., saponified polyacrylamide) plus carboxyalkyl polysaccharide in the admixture solution (inclusive of the water) is at least 10%. In typical embodiments the total solids content of the admixture solution is at least 15%. In exemplary practices, the total solids content of the admixture solution was 25%. It is beneficial to add the prepolymerized polycarboxylate polymer (e.g., saponified polyacrylamide) to a concentrated solution of the carboxyalkyl polysaccharide. A solution of 10% wt/vol carboxyalkyl polysaccharide dissolved in water was used in exemplary embodiments, although concentration is not critical so long as the amount is sufficient to form the gelatinous admixture with the polycarboxylate polymer (e.g., saponified polyacrylamide) in the ratio needed.

In embodiments where the polycarboxylate polymer (e.g., saponified polyacrylamide) is in an acidic state (below pH 6.0) or when the polycarboxylate polymer (e.g., saponified polyacrylamide) contains an abundance of amides or amines and few free carboxylate moieties, such as when the polycarboxylate polymer (e.g., saponified polyacrylamide) comprises polyacrylamide or its derivatives, the polycarboxylate polymer (e.g., saponified polyacrylamide) particle may be saponified first, for example, by contacting it with sodium hydroxide for a time sufficient to saponify at least 30 mol. % of the carboxylate moieties or convert at least 30 mol. % of the amide groups to carboxylate groups. Example conditions to saponify polyacrylamide to at least 30 mol. % are to contact the polyacrylamide polymer with a 60% solution of sodium hydroxide in water with heating for a time sufficient to achieve the desired degree of saponification. The saponified particles are precipitated and washed in a suitable organic solvent, such as for example methanol, and the pH adjusted to neutral conditions (e.g., between 6.0 and 8.0). In exemplary practices, the pH was adjusted to 6.5. Although in the exemplary embodiments the polyacrylate polyacrylamide particle was saponified prior to blending it with the carboxyalkyl polysaccharide, the saponification can occur at any time prior to the subsequent treatment with acid and heat described hereafter.

Once the gelatinous admixture is obtained it is dried to a level suitable to grind into a dried composite powder. Typically the admixture should be dried to a moisture content of less than 20%. In exemplary practices the gelatinous admixture is dried to a moisture content of less than 15% or less than 10% or even less than 6%. Any drying techniques tart are not destructive to the carboxyalkylated starch or the synthetic polycarboxylate polymer may be used. Techniques such as a fluidized bed dryer, infra-red or convection ovens are non-limiting examples of techniques that can be used. The dried product is then ground, sheared or otherwise milled to form composite particles of a size of 20-100 mesh (150 µm to 850 µm).

The dried composite particles are contacted with a $C_2$-$C_4$ polyol and surface treated with a mineral acid in a first solution containing a water miscible organic solvent and water. HCl is a preferred mineral acid however other non-crosslinking mineral acids such as HBr, HI, HF, sulfuric, nitric, or phosphoric acids may also be used. The acid promotes formation of carboxylic acids and catalyzes esterification thereof with alcohol groups. Suitable water miscible organic solvents include for example, methanol, ethanol, propanol, methylethylketone, ethyl acetate and the like. In a preferred practice the water miscible organic solvent is methanol. Inclusion of the water miscible organic solvent retards the rate of penetration of the solution into the core region of the particle, which promotes preferential formation of esters on the surface of the particle. The $C_2$-$C_4$ polyol in the first solution may be applied first, followed by contact with the mineral acid, or the mineral acid may included within the first solution. In embodiments where the mineral acid is applied after coating with the $C_2$-$C_4$ polyol, the mineral acid may be applied in a liquid or gaseous state. A gaseous state is preferred to maximize surface treatment of the particle and limit penetration into the core.

The amount of the $C_2$-$C_4$ polyol present in the solution contacted with the composite polycarboxylate polymer (e.g., saponified polyaclyamide): carboxyalkyl polysaccharide material should be 0.1% to 10% the weight of the composite material (polycarboxylate polymer (e.g., saponified polyacrylamide)+carboxyalkyl polysaccharide). In preferred practices, the amount of polyol is 0.5% to 3% the weight of the composite material. In an exemplary practice the polyol was present at about 1% of the weight of the composite material.

To further provide surface treatment conditions that promotes surface cross linking more than cross linking within the core region of the particle it is advantageous that the weight of the solution containing the $C_2$-$C_4$ polyol (polyol coating solution) be less than 75% of the weight of the combined polycarboxylate polymer (e.g., saponified polyacrylamide) and carboxyalkyl polysaccharide composite material. In typical practices the polyol coating solution should be 10%-50% the weight of the composite material. In preferred practices the polyol coating solution should be 15% to 30% the weight of the composite material. In exemplary practices, the polyol coating solution is 20%-25% the weight of the composite material.

After drying, the polyol acid coated composite particles are contacted with a trivalent metal salt coating solution comprising water, a dissolved trivalent metal salt and a water miscible organic solvent to coat the surface of the polyol acid coated composite particles. The second water miscible organic solvent may be the same as the first or different. In an exemplary practice the second water miscible organic solvent is also methanol. The preferred trivalent metal salt is an aluminum salt. The exemplary aluminum salt was aluminum sulfate. Other trivalent metals and other anionic components of the salts may also be used. For example iron salts could also be used. Other suitable aluminum salts include aluminum halides, aluminum phosphate, aluminum carbonate and aluminum trihydrate, (aluminum trihydoxide). Typically, the trivalent metal salt solutions should contain 0.1 to 10% wt/vol or more preferably 1-5% of the trivalent metal salt, in exemplary embodiments the aluminum coating solution contained about 3.7% aluminum in water and methanol. A ratio of the water to the water miscible organic solvent may be 1:1 to 0.1:1. In an exemplary method, the ratio of water to methanol used was 0.3 ml of aluminum sulfate in water to 2.0 ml of methanol giving a ratio of 0.15:1.

The heating may occur in a single step or multistep process. In a multistep process, the polyol/acid-coated material may be dried at a first temperature for time effective to evaporate the water miscible organic solvent. In an exemplary method where the water miscible organic solvent was methanol, 10 grams of the polyol/acid-coated composite particles were first heated to a temperature of 60° C. in a convection oven for about 2 hours to dry the particles. The particles are typically dried to moisture content of less than 10%, and in preferred practices to a moisture content of less than 6%.

The polyol/acid/trivalent ion-coated composite material is heated for a sufficient time and at a temperature of 100-190° C., which is effective to form esters crosslinks between the carboxyalkyl polysaccharide and/or the saponified polyacrylamide through the $C_2$-$C_4$ polyol, in typical practices the temperature effective for cross linking is 120-160° C. In an exemplary method the temperature was 140° C. and the time was 10-17 minutes with Infra-Red heating. Time will vary wish temperature conditions.

To facilitate preferential coating of the surface of the polyol acid coated composite particle rather than the interior portions thereof, a relatively small ratio of aluminum salt solution to polyol acid coated particles is preferably used. In typical embodiments the volume per gram ratio of the aluminum salt solution to polyol acid coated particles is from 1 ml per 10 g to 1 ml per 100 g. One ml per 15 g to 1 ml per 30 g is most effective. In an exemplary practice the ratio was 1 ml of aluminum sulfate in methanol and water to 21 grams of polyol acid coated composite particles. Coating the polyol acid coated particles may be done by stirring, agitation, by spraying or by aerosol coating, for example, in a fluidized bed hopper.

After coating the polyol acid coated composite particles with trivalent metal salts, the particles are again dried to remove the second water miscible solvent and heated to a temperature of 100-190° C. forming dual crosslinked composite particles. A heating temperature of 120-160° C. is preferred, and a heating temperature of 140° C. is exemplified. The drying step may cause agglomeration of the particles. Such agglomerates may be broken up by grinding, milling or agitation and if desired re sieved to a mesh size of about 20-100.

The final composite polycarboxylate polymer (e.g., saponified polyacrylamide): carboxyalkyl polysaccharide particles made according to the processes described herein will exhibit a FSC of at least 40 g/g, a CRC of at least 25 g/g, an AUL of at least 15 g/g under a load of 0.7 psi, and a SFR of at least 50 ml/min with 0.9% saline. In certain embodiments particles will exhibit a FSC of at least 47 g/g, a CRC of at least 27 g/g, an AUL of at least 18 g/g under a load of 0.7 psi, and a SFR of at least 180 ml/min. In still other embodiments the particles will exhibit a FSC of at least 47 g/g, a CRC of at least 27 g/g, an AUL of at least 18 g/g under a load of 0.7 psi, and a SFR of at least 180 ml/min.

The composites of the present disclosure may be mixed with other co-absorbent materials to provide absorbent compositions. In an embodiment, the absorbent compositions comprise from about 1 to about 99% (w/w) of the composite, and from about 99 to about 1% (w/w) of the co-absorbent material. Non-limiting examples of co-absorbent materials include synthetic absorbent polymers, starch-based absorbents, mannose containing polysaccharides, fibers and mixtures thereof.

Non-limiting examples of starch-based absorbents include glass-like starches such as disclosed by Huppé et al. (CA 2,308,537); amylopectin networks such, as disclosed by Thibodeau et al. (CA 2,462,053); polysaccharide agglomerates such as disclosed by Chevigny et al. (CA 2,534,026); hydroxyethyl starch; hydroxy-propyl starch; starch nanocomposites such as disclosed by Berrada et al. (CA 2,483,049): and mixtures thereof.

Non-limiting examples of mannose containing polysaccharides include guar gum, tara gum, locust bean gum, konjac, mesquite, gum, psyllium extracts, fenugreek extracts and mixture thereof. The mannose containing polysaccharides may be chemically or enzymatically modified (i.e. mannose derivatives), cross-linked or in the form of nanocomposite materials.

Non-limiting examples of fibers include cellulose, viscose, rayon, cellulose acetate, polyamides (i.e. Nylon™), polyalkylenes, polyethylene, polypropylene, bi-component fibers, polyesters, polylactides, polypropanediols, polyhydroxyalkanoates, Lyocell™, sphagnum and mixtures thereof.

The synthetic absorbent polymers to be used as co-absorbent materials in the absorbent compositions of the present disclosure are generally obtained from the polymerization, typically by radical or radical graft polymerization, of monomers, non-limiting examples of which include acrylic acid, acrylate salts, acrylic ester, acrylic anhydride, methacrylic acid, methacrylate salts, methacrylic esters, methacrylic anhydride, maleic anhydride, maleic salts, maleate esters, acrylamide, acrylonitrile, vinyl alcohol, vinyl pyrrolidone, vinyl acetate, vinyl guanidine, aspartic acid, aspartic salts and mixtures thereof.

The composites of the present disclosure, or absorbent compositions comprising such composites, are suitable for use in methods for absorbing liquids. Non-limiting examples of liquids include water, aqueous solutions, physiological fluids and saline solutions.

The composites of the present disclosure could be used in hygiene articles, such as diapers, incontinence products, food pads and sanitary napkins. The composites of the present disclosure may also be used in other applications such as in food pads, in agricultural, horticultural and forestry applications for retaining water in the soil and for the release of water to the roots of plants and trees; in the textile industry, in printing applications, in absorbent paper products, in ore treatments, in concrete additives, in pet litter, in water treatment, in cloud control, in drilling fluids (i.e. lost circulation materials, fracturing fluids); in food pads (i.e. applications related to the transportation of fresh, food and food packaging), in detergents, anti-condensation coatings, in fire-fighting gels; in sealing materials, in bandages and surgical pads (i.e. wound dressings): as chemical absorbents for the cleanup of acidic and/or basic aqueous spills including water soluble chemical spills, as polymeric gels for the slow and controlled release of cosmetics, and pharmaceuticals (also known as drug delivery systems), and finally in the manufacture of artificial snow. Those composites could also be used as absorbents for liquids, non-limiting examples of which include water, aqueous solutions, physiological fluids and saline solutions.

Section III.—Examples

Unless otherwise indicated by content, the following examples illustrate production of composite superabsorbent CMS-Polyacrylamide (theoretical 70 mol. %) saponified particles at a CMS weight ratio of about 40% (CMS- PAAm70; 40:60) by using physical mixing of reactants with washing and drying of the final particles. The examples also illustrates reproducibility of the process in obtaining average performance values of 47.27, 18, and 80 for HSC-CRC-AUL- and SFR respectively. The examples also highlight the synergetic effect on the AUL and SFR of the composites (CMS-PA Am$_{70}$; ~40:60) previously double-coated with the Glycerol-HCl and the aluminum sulfate in methanol.

Materials

Particles of untreated carboxymethyl starch were obtained by reactive extrusion, methanol purification and drying from Archer Daniels Midland, under the trademark "non-surface treated BioSAP™" (non-surface treated), according to a procedure similar as described in patent application of Godin et al. WO App. 2010/096742 WO (with the exception of the surface treatment). Acrylamide and sodium persulfate were obtained obtained from Sigma-Aldrich (St-Louis, Mo. Sodium hydroxide, sodium chloride, hydrochloric acid and methanol were obtained from Labmat (Quebec city, Canada). Hydrogen chloride was obtained from Air Liquide (Paris, France). For drying particles, a Panasonic NB-G100P infra-red oven was used. A Braun™ model KSM grinder was used to grind particles in laboratory scale quantities.

Test Methods

FSC, CRC and AUL. Several measurement methods are used to characterize the swelling capacity of the test materials as discussed in *Modern Superabsorbent Polymer Technology* (Buchholz, F. L. and Graham, A. T. Eds., Wiley-VCH, New York, 1998. section 4.6.1. Swelling Capacity: Theory and Practice, p. 147). In the field of superabsorbents, the Gravimetric Swelling Capacity [also called the Free Swell Capacity (FSC)] and the Centrifuge Capacity [also called the Centrifuge Retention Capacity (CRC)] are recommended methods. The FSC and the CRC were used to characterize the swelling capacities of the obtained absorbent products.

Tea bags (10×10 cm) were made from Heat scalable Ahlstrom (Chirnside Duns, UK) filter paper (16.5±0.5) g/m grade 07291. The FSC obtained with a 0.9% NaCl solution was determined according to the recommended test method WSP 240.2 (05) A from Worldwide Strategic Partners (EDANA-INDA). The tea-bag used, however, slightly bigger, as described above. The CRC measurement also determined with a 0.9% NaCl solution was determined according to the recommended test method WSP 241.2 (05) A from Worldwide Strategic Partners (EDANA-INDA). Again the bag used was slightly bigger. The AUL at 0.7 Psi. in 0.9% NaCl solution was determined according to the recommended test, method WSP 242.2 (05) A from Worldwide Strategic Partners (EDANA-INDA). The required petri dish tray had a bottom surface area of 177 cm$^2$, the filter plate had a diameter of 32 mm and the piston made from stainless steel. Those factors are not believed to have any significant influences on AUL measurements The Saline Flow Rate (SFR) measurements were made using a device illustrated in FIG. 4 that provides results similar to Gel Bed Permeability (GBP) or Saline Conductivity Rate (SCR) used by others. The device includes the piston and cylinder assembly 10 shown in FIG. 4A. The assembly includes a shallow Plexiglas cylinder (A) having an inner diameter of 7.0 cm and has a 150 Mesh grid (B) fixed on one end. The cylinder A is equipped with a drain hole (C) at a height of 8.7 cm to keep the solution level constant.

A hollow shafted piston (D) of 6.9 cm of diameter having a flattened end piece 20 containing 25 holes (E) (see FIG. 4B) having a diameter of 5 mm each in Plexiglas was also crafted. The end of the piston D was fixed with a 150 Mesh grid (F). The piston was equipped with a hollow shaft (G) on the opposite end, the shaft being equipped with, an inlet (H) to plug into a pump assembly (depicted in FIG. 4C) and with baffles (I). The swollen superabsorbent gel particles (J) are sandwiched between the cylinder mesh grid (B) and the piston mesh grid (F). The hollow shaft G is filled with steel balls (K), having a weight that sums to exert a pressure of 0.3 Psi on the superabsorbent swollen gel particles (J).

Figure 4C:
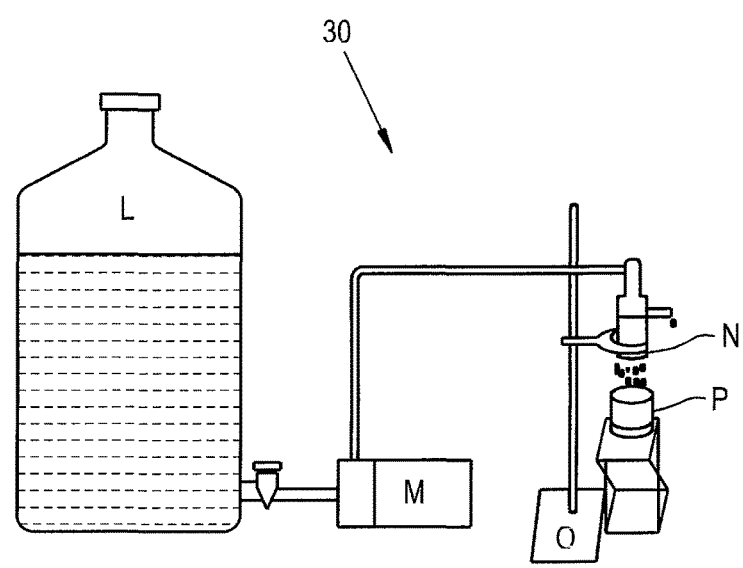

The saline solution is continuously pumped into the cylinder A through an inlet opening H until it reaches a height of 8.7 cm where it is drained out by drain C in the cylinder A to keep the solution column constant. FIG. 4C depicts the entire SFR apparatus 30. A tank (L) comprising 0.9 saline solution is linked to pump (M) which pumps the saline solution into the piston inlet H. The piston rests on pre-swollen superabsorbent particles (J) which are sandwiched between the cylinder and the piston (D). The whole cylinder/piston apparatus rests on a clamped 25 mesh grid (N) located on a lab stand (O), Under the lab stand is located a pre-weighted beaker (P), where the saline solution flowing through the swollen superabsorbent gel is collected and then weighted.

Into the cylinder A, 2.0 g of superabsorbent particles are precisely weighted. The cylinder A is then placed in a crystallizing dish over a fritted disk. The dish is then filed with saline solution until the level reaches about ¾ of the height of the crystallizing dish and the superabsorbent particles are allowed to swell therein for about one hour. After one hour, the piston D is inserted in the cylinder A over the superabsorbent J sandwiched between end plate mesh F of the piston D and end plate mesh B of cylinder A. The piston and the cylinder are then retired from the dish and placed on a 25 mesh grid clamped to a lab stand. The pump M is then plugged into the piston inlet H and the saline solution L is then pumped into the piston and the cylinder until it reaches the drain height outlet C. Once that height reached, the system is allowed flow for a period of 5 minutes for the system to stabilize. After that stabilization period, a pre-weighted beaker is placed under the 25 mesh grid beneath the mesh plate B of cylinder A and collects the saline solution which drips through the swollen gel particles J. The saline flow rate is calculated as the amount of the saline solution L in ml that flows through the swollen polymer J per minute (assuming a solution density of 1 g/ml).

EXAMPLE I

Synthesis of Saponified Polyacrylamide (Paam$_{70}$): Saponification ~70 Mol. %

About 218 g of acrylamide was dissolved under stirring in 1.45 L of distilled water. The solution was heated in a water-bath at 55° C. for 15 mm under argon atmosphere. Methylene bis-acrylamide (MBA: 380 mg) and glycerol (9.64 g in 30 ml of dH2O) were added to the acrylamide solution and kept agitated under argon atmosphere for 10 min. Ammonium persulphate (APS: 260 mg in 20 ml of dH2O) was added to the mixture and the water bath temperature was increased to 95° C. (gel temperature 84-90° C.). A highly viscous gel was obtained within 10 min and the polymerization reaction was kept for 1 hour.

The clear and hard rubbery gel was cut and extruded through a Kitchen Aid to get smaller pieces. The extruded product was then saponified at 70 mol-% with a sodium hydroxide solution (172 g NaOH 50% w/w in 1.45 L dH2O) at 80° C. for 2 h. The saponified product was precipitated in methanol and blended to obtained smaller particles that were pH-adjusted (6.5) in MeOH 85% at 60° C. for 1 h. The neutralized product was filtered and dried in an oven at 60° C. (dH2O was sprayed on the product to avoid low density).

EXAMPLE II

Synthesis of Saponified Polyacrylamide (Paam$_{70}$): Carboxymethyl Starch Composite About 50 g of CMS was dissolved in 500 ml of deionized water at 60° C. for 20 minutes. 75 g of Polyacrylamide saponified at 70 mol-% was added to the CMS solution. The mixture was stirred in a Kitchen Aid vessel, for 2 h. The product was dried below 6% humidity. One hundred g of the dried film was ground to a particle size between 20 and 100 mesh (150-840 microns). These composite particles (10 g) were coated with 2.30 ml of a solution (GH2) which contained 12.70 ml HCl 36% w/w, 85 ml MeOH; 2.25 ml water, and 4.47 g glycerol. The coated powder was dried in a convection oven (60° C.) for 20 minutes. The agglomerates were broken using a spatula and dried in an IR oven at 140° C. for 10-17 minutes and the absorbency properties of the coated composite particles, was determined as shown in Table 1.

showed slightly lower absorption performances (47-26-20) than the above simple coating process for the same CMS/PAAm70 weight ratio (40/60) material and the same surface treatment strategy indicates that the polymer blending glycerol coating with acid treatment coating process is at least as good or better than forming an interpenetrated graft and may require less sophisticated equipment.

EXAMPLE III

Composite CMS-Paam$_{70}$: Glycerol: Aluminum Sulfate Particles with Enhanced SFR The composite CMS-PAAm$_{70}$ particles (50 g) coated with glycerol in the presence of acid prepared according to Example II were mixed with 2.30 ml of the following solution of ammonium sulfate in methanol: 0.30 ml of 28.6 wt. % Al$_2$(SO$_4$)$_3$•14H$_2$O and 2.0 ml MeOH. The aluminum sulfate coated composites were dried in convection oven (60° C.) for 20 minutes forming agglomerates. The dried agglomerates were broken using a spatula and placed in an IR oven at 140° C. for at least 10 min. The absorbency performance parameters FSC, CRC, AUL and SFR were determined and the results are summarized in Table 2.

TABLE 1

Absorbency performance of composite CMS-PAAm$_{70}$: glycerol coated particles

| Sample | Composition | Surface Treatment Conditions | pH | LOD [1] % | FSC g/g | CRC g/g | AUL g/g | SFR [2] ml/min |
|---|---|---|---|---|---|---|---|---|
| Sample 1 | 40 wt-% CMS 60 wt-% (Ex. 1) | Glycerol, HCl 10 min IR (140° C.) | 6.62 | 6.10 | 50 | 31 | 20 | <1 |
| Sample 2 | 40 wt-% CMS 60 wt-% (Ex. 1) | Glycerol, HCl 17 min IR (140° C.) | 6.88 | 8.35 | 47 | 31 | 17 | <1 |
| Sample 3 | 40 wt-% CMS 60 wt-% (Ex. 1) | Glycerol, HCl 15 min IR (140° C.) | 7.00 | 7.95 | 46 | 29 | 20 | <1 |
| Sample 4 | 40 wt-% CMS 60 wt-% (Ex. 1) | Glycerol, HCl 10 mm IR (140° C.) | 6.65 | 5.60 | 49 | 32 | 19 | <1 |
| | | Average | | | 48 ± 2 | 31 ± 1 | 19 ± 1 | <1 |

[1] Loss on dry before surface treatment,
[2] Particles size used for the test: 20-100 mesh.

The Glycerol-HCl coating strategy combined with heat treatment provided the right conditions to yield average absorption performances of 48-31-19 in FSC-CRC-AUL, respectively, without dramatically jeopardising the FSC and the CRC after the surface treatment. The SFR of these particles was, however, substantially impaired in comparison to conventional polyacrylamide SAP particles. Nonetheless, the fact that the interpenetrated graft network—IPN

TABLE 2

Absorbency performance of composite CMS-PAAm$_{70}$: glycerol/aluminum sulfate-coated particles

| Sample | Composition | pH | LOD[1] % | Surface Treatment | FSC g/g | CRC g/g | AUL g/g | SFR [2] ml/min |
|---|---|---|---|---|---|---|---|---|
| Sample 5 | 40 wt-% CMS 60 wt-% Ex. 1 | 6.7 | 5.60 | Glycerol, HCl Al$_2$(SO4)$_3$ 10 min IR (140° C.) | 46 | 27 | 19 | 194 |
| Sample 6 | 40 wt-% CMS 60 wt-% Ex. 1 mix | 6.4 | 5.10 | Glycerol, HCl Al$_2$(SO$_4$)$_3$ 10 min IR (140° C.) | 47 | 25 | 19 | 195 |
| Sample 7 | 40 wt-% CMS 60 wt-% Ex. 1 | 6.7 | 3.10 | Glycerol, HCl Al$_2$(SO$_4$)$_3$ 11 min IR (140° C.) | 47 | 28 | 17 | 175 |
| Sample 8 | 40 wt-% CMS 60 wt-% Ex. 1 | 6.8 | 5.90 | Glycerol, HCl Al$_2$(SO$_4$)$_3$ 12 min IR (140° C.) | 46 | 27 | 16 | 165 |
| | | | | Average | 47 ± 1 | 27 ± 1 | 18 ± 1 | 180 ± 15 |

[1] Loss on dry before surface treatment.
[2] Particles size used for the test: 20-100 mesh.

The data in Table 2 demonstrates a surprising and dramatic increase in SFR by aluminum over coating of the composite CMS-PAAm$_{70}$: glycerol composite particles without any substantial effect on FSC, CRC or AUL. FIG. 3 illustrates this improved efficiency in SFR is rapidly obliterated if the CMS composition exceeds 40% of the weight percentage of polymeric material (e.g., CMS+PAA$_m$).

EXAMPLE IV (COMPARATIVE)

Composite Formation and Surface Treatment with Combined Solution of Aluminum Sulfate with HCl/Glycerol (One Pot)

Purified carboxymethyl starch obtained by reactive extrusion (Non surface treated BioSAP™, 50 g) was dissolved in 500 ml of distilled water. Ground saponified polyacrylamide hydrogel (75 g solids) was added to the solution and stirred in a kitchen aid for 2 hours. The blended product was dried in a convection oven until if reached a moisture content of 6%, The resulting solid was ground to obtain particles having a size ranging from 20 to 100Mesh (150 µm to 850 µm).

A solution comprising 12.70 ml of concentrated hydrochloric add (36% w/w), 8.55 g of aluminum sulfate hydrated 14 times, 4.47 g of glycerol, 85 ml of methanol and 2.30 ml of distilled water was prepared. From this solution, 2.30 g was mixed with 10 g the composite. The composite was then transferred in a convection oven for 20 minutes. The composite was then heated in the infra-red oven at a temperature of 140° C. for a period of at least 15 minutes. The powder was let to cool at room temperature and was further characterized for its absorbent characteristics; A FSC of 48 g/g, A CRC of 30 g/g, an AUL, at 0.7 Psi of 13 g/g was obtained, however, the SFR was under 5 ml/min.

EXAMPLE V (COMPARATIVE)

Composite Formation and Surface Treatment with Aluminum Sulfate Followed by Hydrochloric Acid/Glycerol (Reversed Sequence)

Purified carboxymethyl starch obtained by reactive extrusion (Non surface treated BioSAP™, 50 g) was dissolved in 500 ml of distilled Water. Ground saponified polyacrylamide hydrogel (75 g solids) was added to the solution and stirred in a kitchen aid for 2 hours. The blended product was dried in a convection oven until it reached a moisture content of 6%. The resulting solid was ground to obtain particles having a size ranging from 20 to 100 Mesh (150 µm to 850 µm).

A solution comprising 19.78 g of distilled water and 19 g of aluminum sulfate hydrated 14 times was prepared. From this solution, 0.35 g was mixed with 2.00 ml of methanol and added to 10 g of the composite. The mixture was stirred using a spatula. The mixture was then transferred in a convection oven at 60° C. for 20 minutes. Another solution comprising 4.47 g of glycerol, 15 g of HCl 36% and 2.30 g of distilled water was made. This solution (0.40 g) was mixed with 2.00 ml of methanol and added to the dried sulfate treated blend. The composite was then retransferred again in the convection oven for 20 minutes. The composite was then heated in the infrared oven at a temperature of 140° C. for a period of at least 15 minutes. The powder was let to cool at room temperature and was further characterized for its absorbent characteristics: A FSC of 48 g/g. CRC of 28 g/g, an AUL at 0.7 Psi of 15 g/g and a Saline Flow Rate of 5 ml/min was obtained.

EXAMPLE VI

Composite Formation and Surface Treatment with Hydrochloric Acid/Glycerol Followed by Aluminum Sulfate Purified carboxymethyl starch obtained by reactive extrusion (Non surface treated BioSAP™, 50 g) was dissolved in 500 ml of distilled water. Ground saponified polyacrylamide hydrogel (75 g solids) was added to the solution and stirred in a kitchen aid for 2 hours. The blended product was dried in a convection oven until it reached a moisture content of 6%. The resulting solid was ground to obtain particles having a size ranging from 20 to 100 Mesh (150 µm to 850 µm).

A solution comprising 4.47 g of glycerol, 15 g of HCl 36% and 2.30 g of distilled water was made. This solution (0.49 g) was mixed with 2.00 ml of methanol and added to 10 g of the composite. The mixture was stirred using a spatula. The mixture was then transferred in a convection oven at 60° C. for 20 minutes. Another solution comprising 19.78 g of distilled water and 19 g of aluminum sulfate hydrated 14 times was prepared. From this solution, 0.35 g was mixed with 2.00 ml of methanol and added to the composite. The composite was then retransferred again in the convection oven for 20 minutes. The composite was then heated in the Infra-red oven at a temperature of 140° C. for a period of at least 15 minutes. The powder was let to cool at room temperature and was further characterized for its absorbent characteristics: A Free Swell Capacity of 47 g/g. A Centrifuge Retention Capacity of 27 g/g, an Absorption under load at 0.7 Psi of 19 g/g and a Saline. Flow Rate of 195 ml/min.

EXAMPLE VII

Composite Formation and Surface Treatment with Glycerol/Hydrogen Chloride Permeation Followed by Aluminum Sulfate Purified carboxymethyl starch obtained by reactive extrusion (Non surface treated BioSAP™, 50 g) was dissolved in 500 ml of distilled water. Ground saponified polyacrylamide hydrogel (75 g solids) was added to the solution and stirred in a kitchen aid for 2 hours. The blended product was dried in a convection oven until it reached a moisture content of 6%. The resulting solid was ground to obtain particles having a size ranging from 20 to 100 Mesh (150 µm to 850 µm).

The composite (10 g) was put in 250 ml round bottom flask. The air was driven out of the round bottom flask by vacuum (−29 mmHg), Hydrogen chloride (80 ml) was then added in the flask and kept at pressure constant for 10 minutes. A solution comprising 4.47 g of glycerol, 17.30 g of distilled water was made. From this solution, 0.270 g was mixed with 2.00 ml of methanol. This solution was put in the round bottom flask and thoroughly mixed with the particles with a spatula.

A solution comprising 19.78 g of distilled water and 19 g of aluminum sulfate hydrated 14 times was prepared. From this solution, 0.35 g was mixed with 2.00 ml of methanol and added to the composite. The mixture was then transferred in a convection oven at 60° C. for 20 minutes. The composite was then heated in the Infra-red oven at a temperature of 140° C. for a period of at least 15 minutes. The powder was let to cool at room temperature and was further characterized: for its absorbent characteristics: A Free Swell Capacity of 49 g/g, A Centrifuge Retention Capacity of 27 g/g, an Absorption under load at 0.7 Psi of 17 g/g and a Saline Flow Rate of 180 ml/min.

EXAMPLE VIII

Composite Formation and Surface Treatment with Hydrochloric Acid/Glycerol followed by Aluminium Sulphate Un-surface-treated purified carboxymethyl starch obtained by reactive extrusion (Non surface treated Bio-SAP™, 50 g) was dissolved in 500 ml of distilled water. Saponified polyacrylamide (75 g) was added to the solution and stirred in a kitchen aid for 2 hours. The product was dried in a convection oven until it reached a moisture content of 6%. The resulting solid was ground to obtain particles having a size ranging from 20 to 100 Mesh (150 μm to 850 μm).

A solution comprising 4.47 g of glycerol, 15 g of HCl 3.6% and 2.30 g of distilled wafer was made. This solution (0.49 g) was mixed with 2.00 ml of methanol and added to 10 g of the composite. The mixture was stirred using a spatula. The mixture was then transferred in a convection oven at 60° C. for 20 minutes. Another solution comprising 19.78 g of distilled water and 19.0 g of aluminum sulphate hydrated 14 times was prepared. From this solution, 0.35 g was mixed with 2.00 ml of methanol and added to the composite. The composite was then retransferred again in the convection oven for 20 minutes. The composite was then heated in the infrared oven at a temperature of 140° C. for 17 minutes. The powder was let to cool at room temperature and was further characterized for its absorbent characteristics: A Free Swell Capacity of 50 g/g, A Centrifuge Retention Capacity of 27 g/g, an Absorption under load at 0.7 Psi of 18 g/g and a Saline Flow Rate of 140 ml/min. The pH of the example 1 composite was of 5.70.

TABLE 3

Comparison between particle pH (Example 1 and reverse sequence)

| Particle size | pH (Example 1) | pH (comparative example-Reverse sequence) |
|---|---|---|
| 595 μm-841 μm | 5.70 | 5.54 |
| 400 μm-595 μm | 5.56 | 5.59 |
| 297 μm-400 μm | 5.55 | 5.52 |
| 250 μm-297 μm | 5.55 | 5.48 |
| 149 μm-250 μm | 5.44 | 5.36 |

As observed from Table 3, the pH of the composites is generally higher than pH of particles which are treated with the trivalent metal salt first. Also, we observe that pH decreases with the particle size, which indicates that the contact surface is greater with smaller particles. This seems to confirm a chemical difference between each process sequence.

Not to be bound by theory, it appears that competition between carboxylate-trivalent ionic linkage and ester formation with carboxylic groups in the surface of the particle. In order to achieve especially good performances (in AUL 0.7 Psi and SFR), inducing ester formation conditions should be done prior trivalent ion coating.

What is claimed is:

1. A composite superabsorbent particle comprising
   a synthetic saponified polyacrylamide polymer able to form an hydrogel blended with;
   a carboxyalkylated starch, and further including
   a $C_2$-$C_4$ polyol moiety cross-linking at least one of the carboxyalkylated starch and the synthetic polycarboxylate polymer via ester linkages at a surface of the particle; and
   a trivalent metal ion coating said surface of the particle;
   wherein a ratio of the synthetic polycarboxylate polymer to the carboxyalkylated starch is from 20:80 to 80:20 on a wt:wt basis and the amount of the ester linkages and trivalent metal salt is such that the particle exhibits a FSC of at least 40 g/g, a CRC of at least 25 g/g, an AUL of at least 15 g/g under a load of 0.7 psi, and a SFR of at least 50 ml/min. with 0.9% saline.

2. The composite superabsorbent particle of claim 1, wherein the trivalent metal ion comprises aluminum.

3. The composite superabsorbent particle of claim 1, wherein the carboxyalkylated polysaccharide is carboxymethyl starch.

4. The composite superabsorbent particle of claim 1, wherein the $C_2$-$C_4$ polyol includes: glycerol, ethylene glycol, and propylene glycol.

5. The composite superabsorbent particle of claim 1, wherein the carboxyalkylated polysaccharide is carboxymethyl starch, the $C_2$-$C_4$ polyol is glycerol, and the ratio of the synthetic polyacrylamide polymer to the carboxyalkylated starch is 60:40 on a wt:wt basis.

6. The composite superabsorbent particle of claim 1, having a FSC of at least 47 g/g, a CRC of at least 27 g/g, an AUL of at least 18 g/g under a load of 0.7 psi, and a SFR of at least 180 ml/min.

7. The composite superabsorbent particle of claim 1, wherein the saponified polyacrylamide has a saponification degree of at least 30%.

8. A method of making a composite saponified polyacrylamide:carboxyalkyl starch particle comprising the sequential steps of:
   a) blending a polymerized saponified polyacrylamide hydrogel with an aqueous solution of a carboxymethyl starch to form a gelatinous admixture wherein the carboxymethyl starch comprises at least greater than 20% and the saponified polyacrylamide is 20 to less than 90% of the weight of the blend excluding the aqueous solution and any soluble components thereof;
   b) drying the gelatinous admixture to a moisture content of less than 10% forming a dried composite powder;
   c) grinding the dried composite powder to form composite particles of a size of 20-100 mesh;
   d) contacting a surface of the dried composite particles with a first solution containing a $C_2$-$C_4$ polyol and with a non-crosslinking mineral acid forming an acidic polyol coated composite material;
   e) contacting the surface-coated composite particles with a second solution comprising a trivalent metal salt;
   f) heating the acidic dual-coated composite material at a temperature of 100-190° C. for a time sufficient to crosslink to form ester or amide crosslinks between the $C_2$-$C_4$ polyol and at least one of the carboxymethyl starch and the saponified polyacrylamide on the surface of the particle, forming a surface crosslinked composite particle.

9. The method of claim 8, wherein the first solution containing the $C_2$-$C_4$ polyol and non-crosslinking mineral acid further includes at least 50% wt/wt of a water miscible organic solvent.

10. The method of claim 8, wherein the second solution containing the trivalent metal salt includes at least 50% wt/wt of a water miscible organic solvent.

11. The method of claim 10, wherein the water miscible organic solvent is methanol.

12. The method of claim 8, wherein the blending occurs without exerting shear forces on the mixture.

13. A composite superabsorbent particle comprising
    a) a carboxyalkylated starch content ranging from greater than 20% to 80% wt/wt of the particle;
    b) a synthetic polycarboxylate polymer ranging from 80% to 20% wt/wt of the particle;
    c) a surface region comprising ester linkages between at least one of the carboxyalkylated starch, a C2-C4 polyol and the polycarboxylate polymer, and ionic cross links with a trivalent metal ion;
    d) a core region, wherein the surface region of the particle has a higher concentration of the ester linkages and ionic cross links with the trivalent metal than the core region; and
    e) wherein the particle exhibits a FSC of at least 40 g/g, a CRC of at least 25 g/g, an AUL of at least 15 g/g under a load of 0.7 psi, and a SFR of at least 50 ml/min. with 0.9% saline.

14. The composite super absorbent particle according to 13, wherein the particle exhibits a FSC of at least 40 g/g, a CRC of at least 25 g/g, an AUL of at least 15 g/g under a load of 0.7 psi, and a SFR of at least 60 ml/min with 0.0.90.9% saline.

* * * * *